(12) United States Patent
Yoon

(10) Patent No.: US 7,308,679 B2
(45) Date of Patent: Dec. 11, 2007

(54) METHOD AND COMPUTER PROGRAM PRODUCT FOR PROVIDING A META-DATA PROGRAMMING LANGUAGE LEVEL INTERFACE

(75) Inventor: Young-Jun Yoon, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 823 days.

(21) Appl. No.: 10/672,096

(22) Filed: Sep. 26, 2003

(65) Prior Publication Data

US 2005/0071852 A1    Mar. 31, 2005

(51) Int. Cl.
*G06F 9/45* (2006.01)

(52) U.S. Cl. ............... 717/114; 709/316

(58) Field of Classification Search ........... 717/108, 717/114; 709/316
See application file for complete search history.

(56) References Cited

U.S. PATENT DOCUMENTS

| | | | |
|---|---|---|---|
| 5,872,973 A * | 2/1999 | Mitchell et al. | 719/332 |
| 6,016,392 A | 1/2000 | Jordan | 395/682 |
| 6,305,007 B1 | 10/2001 | Mintz | 717/1 |
| 6,378,003 B1 * | 4/2002 | Danforth | 719/316 |
| 6,397,384 B1 | 5/2002 | Briggs | 717/165 |
| 7,165,239 B2 * | 1/2007 | Hejlsberg et al. | 717/114 |
| 2002/0004815 A1 | 1/2002 | Muhlestein et al. | 709/201 |
| 2002/0165995 A1 | 11/2002 | Matula et al. | 709/316 |
| 2002/0165996 A1 | 11/2002 | Hrebejk et al. | 709/316 |
| 2002/0184401 A1 | 12/2002 | Kadel, Jr. et al. | 709/315 |
| 2003/0005180 A1 * | 1/2003 | Schmit et al. | 709/328 |
| 2003/0018832 A1 | 1/2003 | Amirisetty et al. | 709/328 |
| 2003/0023773 A1 | 1/2003 | Lee et al. | 709/328 |
| 2003/0033446 A1 | 2/2003 | Noden | 709/328 |
| 2003/0051229 A1 | 3/2003 | Boyle | 717/116 |
| 2003/0056022 A1 | 3/2003 | Carlson et al. | 709/315 |
| 2003/0070006 A1 | 4/2003 | Nadler et al. | 709/330 |
| 2003/0121024 A1 * | 6/2003 | Hill et al. | 717/107 |

* cited by examiner

*Primary Examiner*—John Chavis
(74) *Attorney, Agent, or Firm*—Cantor Colburn LLP; Lily Neff

(57) ABSTRACT

A method for providing a meta-data programming language level interface is disclosed. The method includes receiving an object name from a client program via a meta-data retrieval API, where the object name corresponds to an object located in a runtime environment that includes one or more methods. Meta-data associated with the object is requested from the runtime environment. Meta-data is received for each method included in the object. The meta-data for each method is transmitted to the client program via the meta-data retrieval API.

22 Claims, 4 Drawing Sheets

METHOD AND COMPUTER PROGRAM PRODUCT FOR PROVIDING A META-DATA PROGRAMMING LANGUAGE LEVEL INTERFACE

BACKGROUND OF THE INVENTION

The present disclosure relates generally to a method for providing a meta-data programming language level interface and in particular, to a method for providing a meta-data programming language interface that may be accessed during program runtime.

Today's Internet driven economy has accelerated users' expectations for unfettered access to information resources and transparent data exchange among applications. One of the key issues limiting data interoperability today is that of incompatible meta-data. Meta-data is information about other data, or simply data about data. Meta-data is typically utilized by tools, databases, applications and other information processes to define the structure and meaning of data objects. Unfortunately, most applications are designed with proprietary schemes for modeling meta-data. Applications that define data using different semantics, structures and syntax are difficult to integrate, impeding the free flow of information access across application boundaries. This lack of meta-data interoperability hampers the development and efficient deployment of numerous business solutions (e.g., data warehousing, business intelligence, software development).

The Common Object Request Broker Architecture (CORBA) specification enforces a language neutral interface, or meta-data, definition for remote distributed object services. There are at least two ways in which a CORBA enabled object or service can be defined. First, by defining a distributed service's interface in an interface definition language (IDL) and deriving each language level interface via an IDL compiler for each language. Second, a CORBA enabled object or service may be defined by taking an existing service defined already in a particular programming language (e.g., Java, C++, Ada) and constructing a language neutral interface definition from the programming language level interface. In the second scenario, a particular programming language level interface must be examined in a purely abstract manner without any programming language specific validation of referenced types in an interface definition so that a language neutral interface definition can be derived from it.

Currently, many object-oriented programming languages define an interface and/or abstract class definition that describes the API provided by a program module service. This is done to clearly separate the abstract interface from the implementation class that implements one or more of the abstract interface APIs. This type of programming separation technique allows developers to provide distributed objects that expose their remote interfaces in a purely abstract manner. This allows distributed clients of the distributed objects to use that abstract interface information to learn about the service. This information may be utilized for many purposes including dynamic method invocation, client-side proxy of target service generation and client-side tooling for distributed object services. But currently, in order to achieve such interface to implementation separation in a distributed environment, the developer would be required to take the existing interface definitions already defined at its language level and redefine them as distributed object definitions and work back down into the language level to piece them together.

SUMMARY OF THE INVENTION

In one embodiment, a method for providing a meta-data programming language level interface is disclosed. The method includes receiving an object name from a client program via a meta-data retrieval API, where the object name corresponds to an object located in a runtime environment that includes one or more methods. Meta-data associated with the object is requested from the runtime environment. Meta-data is received for each method included in the object. The meta-data for each method is transmitted to the client program via the meta-data retrieval API.

In another embodiment, a computer program product for a method for providing a meta-data programming language level interface is disclosed. The computer program product comprises a storage medium readable by a processing circuit and storing instructions for execution by the processing circuit for performing a method. The method includes receiving an object name from a client program via a meta-data retrieval API, where the object name corresponds to an object located in a runtime environment that includes one or more methods. Meta-data associated with the object is requested from the runtime environment. Meta-data is received for each method included in the object. The meta-data for each method is transmitted to the client program via the meta-data retrieval API.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
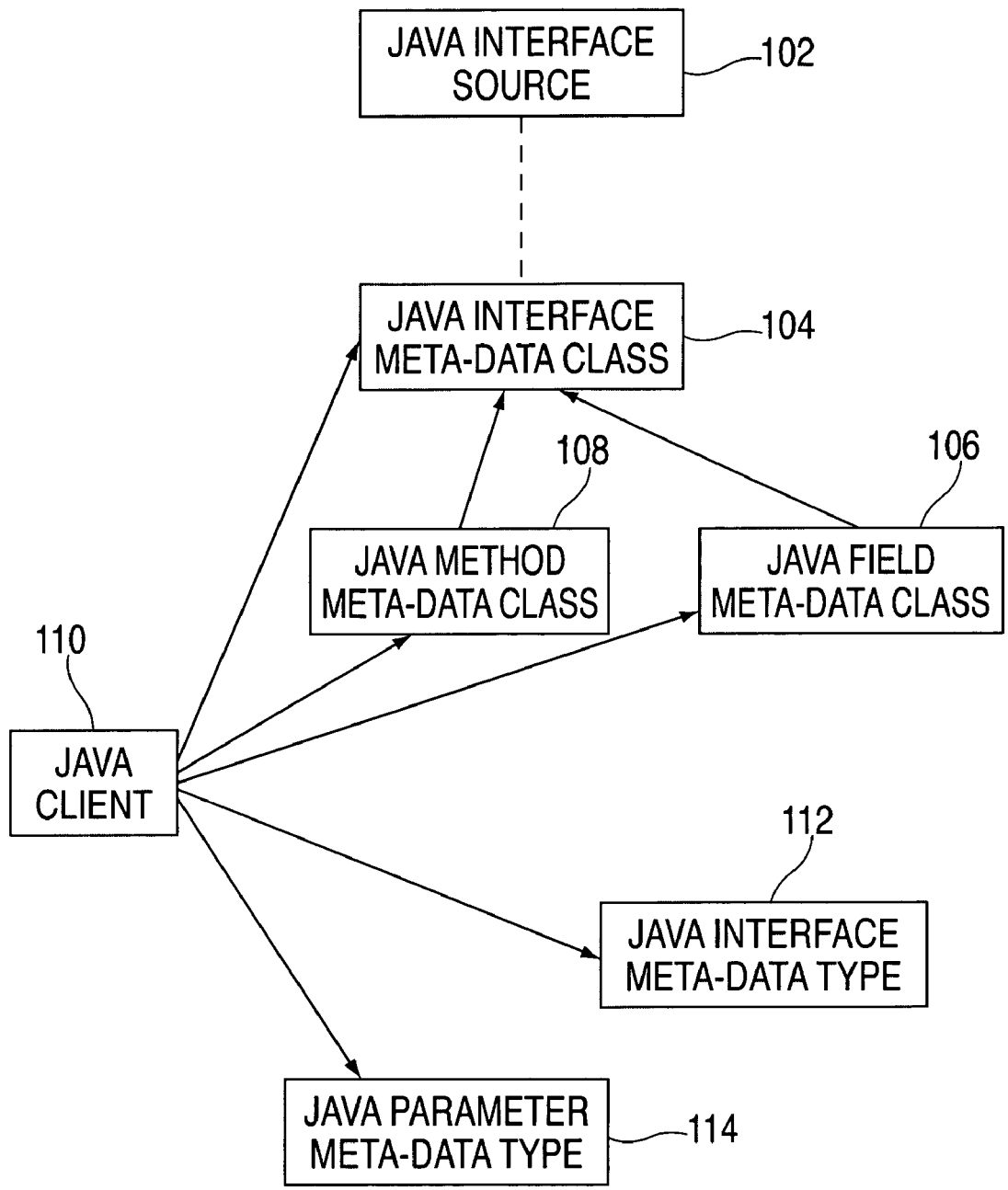
FIG. 1 is a block diagram of high level exemplary meta-data provider classes for providing a meta-data programming language level interface in the Java programming language.

An exemplary embodiment of the present invention provides a tightly integrated programming language level interface/service meta-data application programming interface implementation within object-oriented or service-oriented programming languages. A client program may introspect the meta-data of any running object in a purely abstract manner using these API methods. An exemplary embodiment of the present invention provides an integrated way for any object-oriented programming language to provide abstract interface level meta-data within its program language runtime environment rather than relying on a separate interface definition language for a given programming language level interface definition. This support allows programming languages that provide this functionality to achieve bottom-up mapping of their programming language level interface definition to more abstract distributed object level interface definition. This bottom-up mapping technique allows any running object with this programming language level interface/service meta-data retrieval API support to be dynamically introspected during run-time. This includes exposing the running object interface/service meta-data without prior knowledge to the running object API.

In addition, this type of programming separation technique lends itself to providing distributed objects that expose their remote interfaces in a purely abstract manner. This allows distributed clients of the distributed objects to use that abstract interface information to learn about the service that it is planning to use. The information may be utilized for many purposes including dynamic method invocation, client-side proxy of target service generation, and client-side tooling for distributed object services. In alternate exemplary embodiments of the present invention the same functions are provided within a non-object oriented programming language that clearly define its services in a distributed manner for access by distributed clients within their own programming language.

Exemplary embodiments of the present invention, by utilizing purely abstract interfaces obtained through a meta-data retrieval application API, may dynamically introspect the meta-data within a programming language specific environment and provide an abstract interface to a client environment dynamically. The client tooling program may then assemble client method invocations dynamically. In a similar context, with this type of support, a client tooling environment may also display the meta-data information of any programming language specific services in a purely abstract language neutral manner. An exemplary embodiment of the present invention describes the manner in which programming languages may furnish this purely abstract interface definition without any unnecessary language specific validation and/or runtime checks. This definition may be furnished by program language providers within a programming language through clearly defined APIs for retrieving meta-data.

FIG. 1 is a block diagram of high level exemplary meta-data provider classes for providing a meta-data programming language level interface in a Java programming language. In order for a programming language provider to furnish purely abstract interface definitions, it must first provide a meta-data retrieval API to create and return the running object instance's purely abstract interface meta-data as a meta-data class instance that may be used to retrieve other purely abstract meta-data information. Examples of other purely abstract meta-data information include method signatures, field declarations and exceptions. Each meta-data class instance that represents information such as method, field, exception, and so on, should contain only purely abstract type information.

FIG. 1 depicts a Java programming language interface source 102 that defines the Java interfaces in a human readable format. The Java interface source 102 is compiled into a Java interface meta-data class 104. The Java interface meta-data class 104 is an instantiated class instance that represents the corresponding interface source's 102 abstract interface definition during run-time. The Java interface meta-data class 104 returns the Java interface for any object instantiated by the programming language. The Java client 110 has access to the Java interface meta-data class 104, the Java method meta-data class 108, the Java field meta-data class 106, the Java interface meta-data type 112 and the Java parameter meta-data type 114 via a meta-data retrieval API. As depicted by the arrows, the Java method meta-data class 108 and the Java field meta-data class 106 may be associated with the Java interface meta-data class 104 (e.g., by inheritance). Meta-data types in addition to parameters and interfaces may be accessed via the API. Additional meta-data types may include exceptions and return types.

Given a running Java object, a Java client which has a handle to this Java object may discover its interface/service meta-data which is originally declared in its Java interface source code 102 by using an API. The Java client will use an API built into the Java object itself to initially retrieve a Java interface meta-data class 104. Then, the Java interface meta-data class 104, will request for its containing methods, one or more instances of the Java method meta-data class 108 as well as its fields, represented as one or more instances of the Java field meta-data class 106. Each of these classes (Java interface meta-data class 104, Java field meta-data class 106, Java method meta-data class 108) will hold abstract data such as: its type (in the case of the Java interface meta-data class 104 the type of its Java interface meta-data); its return type as a Java interface meta-data type 112 (in the case of the Java method meta-data class 108, the return type of its Java method meta-data which is an instance of Java interface meta-data); its Java parameter meta-data parameter type 114 (in case of 108—parameter type of its Java method meta-data); and its field type as a Java interface meta-data type 112 type (in the case of the Java field meta-data class 106, the type of its Java field meta-data which will be an instance of Java interface meta-data or a primitive data type). Note that the Java parameter meta-data type 114 and an optional additional exception meta-data type may be implemented as sub-interfaces of the Java interface meta-data type 112.

Figure 2:
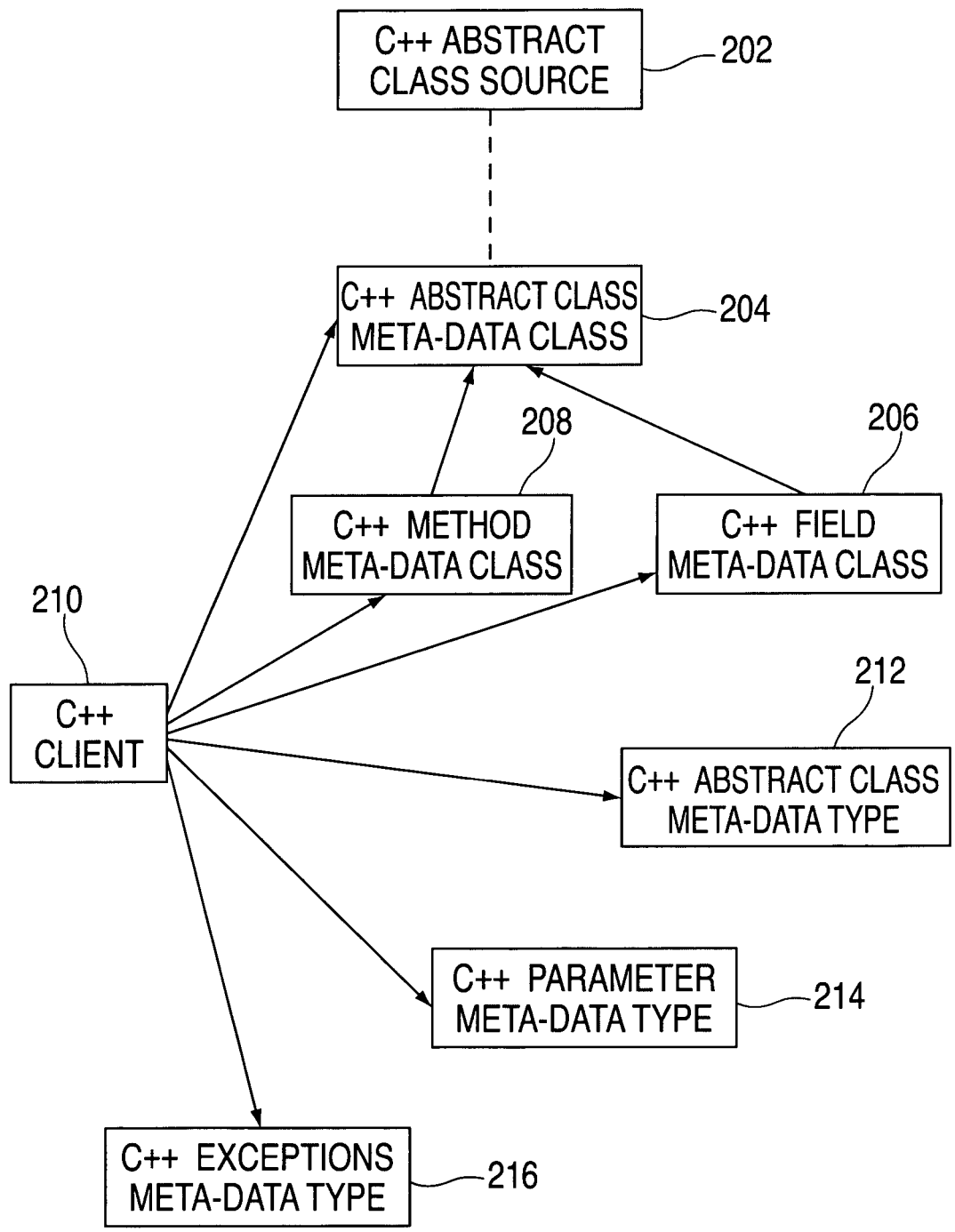
FIG. 2 is a block diagram of high level exemplary meta-data provider classes for providing a meta-data programming language level interface in the C++ programming language.

FIG. 2 is a block diagram of high level exemplary meta-data provider classes for providing a meta-data programming language level interface in a C++ programming language. FIG. 2 includes a C++ abstract class source 202 that contains the abstract class definition, or meta-data, in a human readable format. The C++ abstract class meta-data class 204 represents an instance within a programming language, in this case C++, that returns the C++ interface for any object instantiated by the programming language. The C++ client 210 has access to the C++ abstract class meta-data class 204, the C++ method meta-data class 208, the C++ field meta-data class 206, the C++ abstract class meta-data type 212, the C++ parameter meta-data type 214 and the C++ exceptions meta-data type 216 via a meta-data retrieval API. As depicted by the arrows, the C++ method meta-data class 208 and the C++ field meta-data class 206 may be associated with the C++ abstract class meta-data class 204 (e.g., by inheritance). Meta-data types in addition to parameters, abstract classes and exceptions may be accessed via the API. An additional meta-data types may include a return type.

Given a running C++ object, a C++ client which has a handle to this C++ object may discover its abstract/service meta-data which is originally declared in its C++ abstract source code 202 by using an API. The C++ client will use an API built into the C++ object itself to initially retrieve a C++ abstract meta-data class 204. Then, the C++ abstract meta-data class 204, will request for its containing methods, one or more instances of the C++ method meta-data class 208 as well as its fields, represented as one or more instances of the C++ field meta-data class 206. Each of these classes (C++ abstract meta-data class 204, C++ field meta-data class 206, C++ method meta-data class 208) will hold abstract data such as: its type (in the case of the C++ abstract meta-data class 204 the type of its C++ abstract meta-data); its return type as a C++ abstract meta-data type 212, (in the case of the C++ method meta-data class 208, the return type of its C++ method meta-data which is an instance of C++ abstract meta-data); its C++ parameter meta-data parameter type 214 (in case of 208—parameter type of its C++ method meta-data); and its field type as a C++ abstract meta-data type 212 (in the case of the C++ field meta-data class 206, the type of its C++ field meta-data which will be an instance of C++ abstract meta-data or a primitive data type). Note that the C++ parameter meta-data type 214 and an optional additional exception meta-data type may be implemented as sub-abstracts of the C++ abstract meta-data type 212.

FIG. 1 and FIG. 2 depict exemplary meta-data provider classes for providing a meta-data programing language level interfaces for both Java and C++ programming languages. These are meant to be examples of two programing languages that may support a meta-data retrieval API. Other languages (e.g., COBOL, Eiffel, Pascal, Ada) may also be implemented with exemplary embodiments of the present invention.

In an exemplary embodiment of the present invention, the Java programming language API may be provided by utilizing the bytecode of the language level interface class and providing an API to retrieve meta-data information for the given interface class in a purely abstract manner (e.g., via string data). Java class meta-data information such as field(s) and/or method(s) may be reflected without the required validation of any referenced classes (e.g., required when Java Reflection API is used). This allows applications that require field(s)/method(s) information at an object interface level for code generation (e.g., ejbdeploy, rmic) and/or application assembly or deploy tools (e.g., application assembly tool, application server deployment tool) to be able to retrieve such information without burdening itself by having to load all referenced classes during Java Reflection API operations.

Exemplary embodiments of the present invention provide a new static reflection API for retrieving such meta-data information on a Java class. The implementation may be written in the Java programming language, although it may be written in other programming languages and hooked into the Java programming language via an API. In an exemplary embodiment, the byte array of the Java class is reflected along with a ClassLoader instance to be utilized to search for the requested class. An exemplary embodiment of the present invention creates the internal data structure of the input class byte array (also known as the bytecode) and extracts the field_info section along with the method_info section of the bytecode. Then it processes these bytecode fields along with the bytecode constant pool (cp_info) to find any classes that are referred to by the info sections. Once they are all found, a Java object is constructed that holds all necessary information for representing a field and/or method instance.

Figure 3:
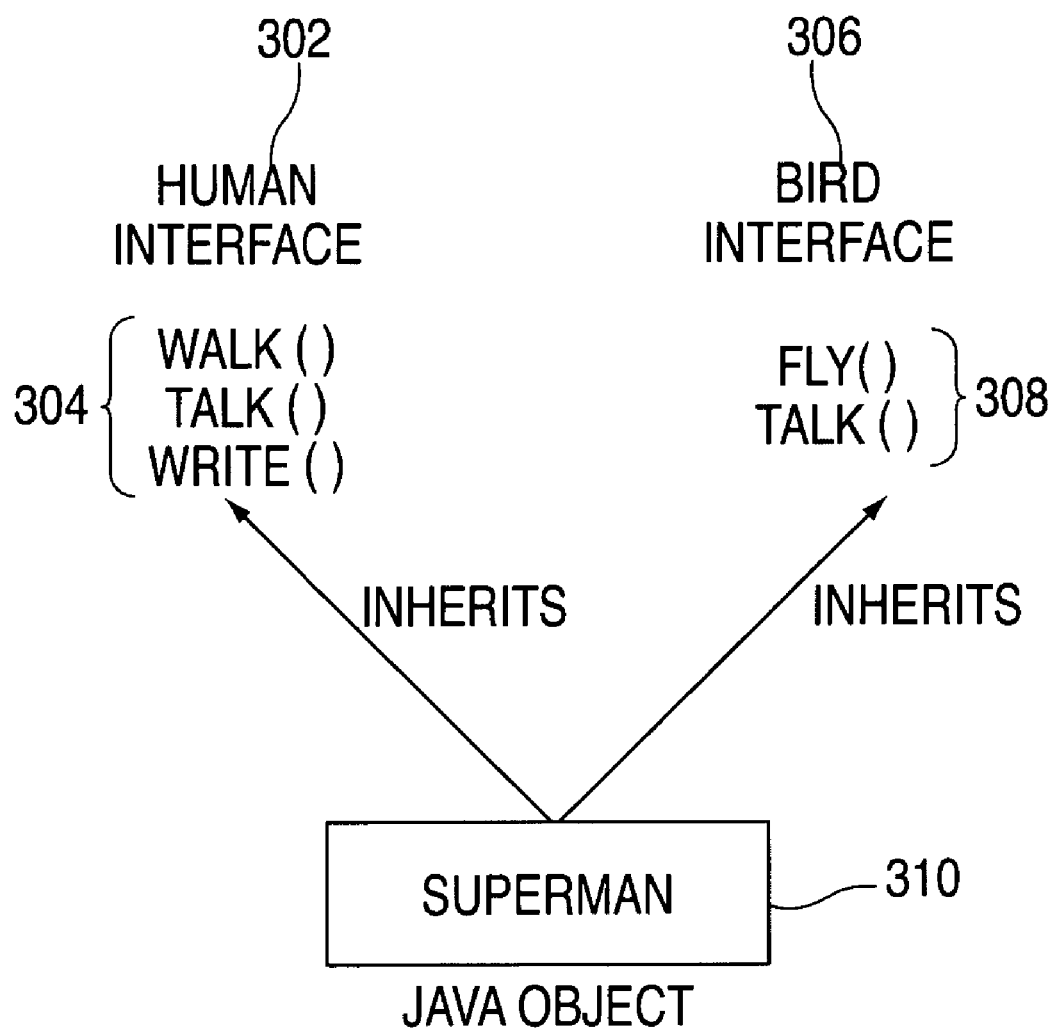
FIG. 3 is a block diagram of exemplary objects and interfaces that may be utilized in an exemplary embodiment of the present invention.

An exemplary embodiment of utilizing a meta-data programming language level interface in the Java programming language follows. These same concepts may be applied to other programming languages (e.g., C++, Eiffel, COBOL). FIG. 3 is a block diagram of exemplary objects and interfaces that may be utilized in an exemplary embodiment of the present invention. FIG. 3 depicts a live, running java object called the superman object 310 that has been initiated from a Java client 110. The superman object 310 inherits from the human interface 302 and from the bird interface 306. The human interface 302 includes three methods 304: walk( ); talk( ) and write( ). The bird interface 306 includes the methods 306: fly( ) and talk( ). In an exemplary embodiment of the present invention, the client code has created an instance of the Superman class and wants to inquire about the meta-data associated with the human interface 302 and bird interface 306.

The human interface 302 may be defined in a Java programming language as a Java source file. The human interface 302 source file may include:

```
// Human interface - enforces walk, talk, write methods
interface Human {
        Destination walk (Destination target);
        Human talk (Human target);
        WriteableObject write (WriteableObject target);
}
```

Similarly, the bird interface 306 source file may include:

```
// Bird interface - enforces fly, talk methods
interface Bird {
        Destination fly (Destination target);
        Bird talk (Bird target);
}
```

In addition, the Superman class may be defined as:

```
// Superman class - which is instantiable during runtime
class Superman implements Human, Bird {
        String name = "Kent, Clark";
        public Superman (String name) {
                this.name = name;
        }
}
```

Note that the implementation of the human interface methods 302 and the bird interface methods 308 would also be defined in a Java Source file. These interface methods have been omitted for brevity.

Also, in this example, a client MAIN function instantiates the Superman class and then disguises it as an interface. Disguising a class as an interface is typical in a distributed environment where the client almost always only works with interfaces since the instantiated object on the client side is a proxy that hides the internal workings of the methods in the class. In addition to disguising the Superman class, the MAIN function calls an exemplary embodiment of a Java interface meta-data class 104 retrieval API, or hook, called "interface" on a live Java object to retrieve the Human interface and Bird interface which the Superman class implements to instantiate a "java.lang.Interface" class for both Human and Bird interface respectively. Input to the "printInterface" method includes an interface name. Output from the "printInterface" method includes meta-data (e.g., the interface definition) associated with the interface that was input. An exemplary embodiment of a client MAIN function, written in a Java language follows:

```
// Client code being driven to use Superman object and its interfaces
public static void main (String[ ] args) {
        // Creating a Superman object
        Superman clark = new Superman("Kent, Clark");
        // Superman disguised as a Human
```

-continued

```
        Human man = (Human) clark;
        // Superman disguised as a Bird
        Bird bird = (Bird) clark;
        // java.lang.Interface class that represents the Human
        (meta-data) interface
        printInterface(man.interface);
        // java.lang.Interface class that represents the Bird
        (meta-data) interface
        printInterface(bird.interface);
}
```

The printInterface interface method that is invoked prints out interface information to a screen. This method may be utilized to duplicate the interface definition dynamically during runtime. Other interface methods may be created from the java.lang.Interface class and utilized to duplicate interface definitions, or interface meta-data during runtime. An exemplary embodiment of a printInterface method follows:

```
private static void printInterface(java.lang.Interface intf)
        //Introspect input java.lan.Interface using a meta-data
        programming
        // language level interface
        Method[ ] intfMethods = intf.getMethods( );
        System.out.println("interface " + intf.getName( ) + " {");
        // Print out interface dynamically during runtime
        for (inst i=0; i,intfMethods.length; i++) {
                String methodName = intfMethods[ ].getName( );
                String returnType = intfMethods[i].getReturnType( );
                String[ ] paramterTypes = intfMethods[i].
                getParameterTypes( );
                System.out.print("\t" + returnType + " " +
                methodName + "(";
                for (intfj = 0; j<parameterTypes.length; j++) {
                        System.out.print(parameterTypes[j].
                        getName( ));
                        // If this isn't the last parameter, append ','
                        If (j < parameterTypes.length−1) {
                                System.out.print(",");
                        }
                }
                System.out.println(");");
        }
        System.out.println("}");
}
```

In an exemplary embodiment of the present invention, executing the MAIN function, including invoking the printInterface method for man.interface ("java.lang.Interface" class instance of the Human interface meta-data class) and bird.interface ("java.lang.Interface" class instance of the Bird interface meta-data class) will result in the following output:

```
        interface Human {
                Destination walk(Destination target);
                Human talk(Human target);
                WriteableObject write(WriteableObject target);
        }
        interface Bird {
                Destination fly(Destination target);
                Bird talk(Bird target);
        }
```

This output will be created even if the Destination and WriteableObject types are not available during runtime.

Figure 4:
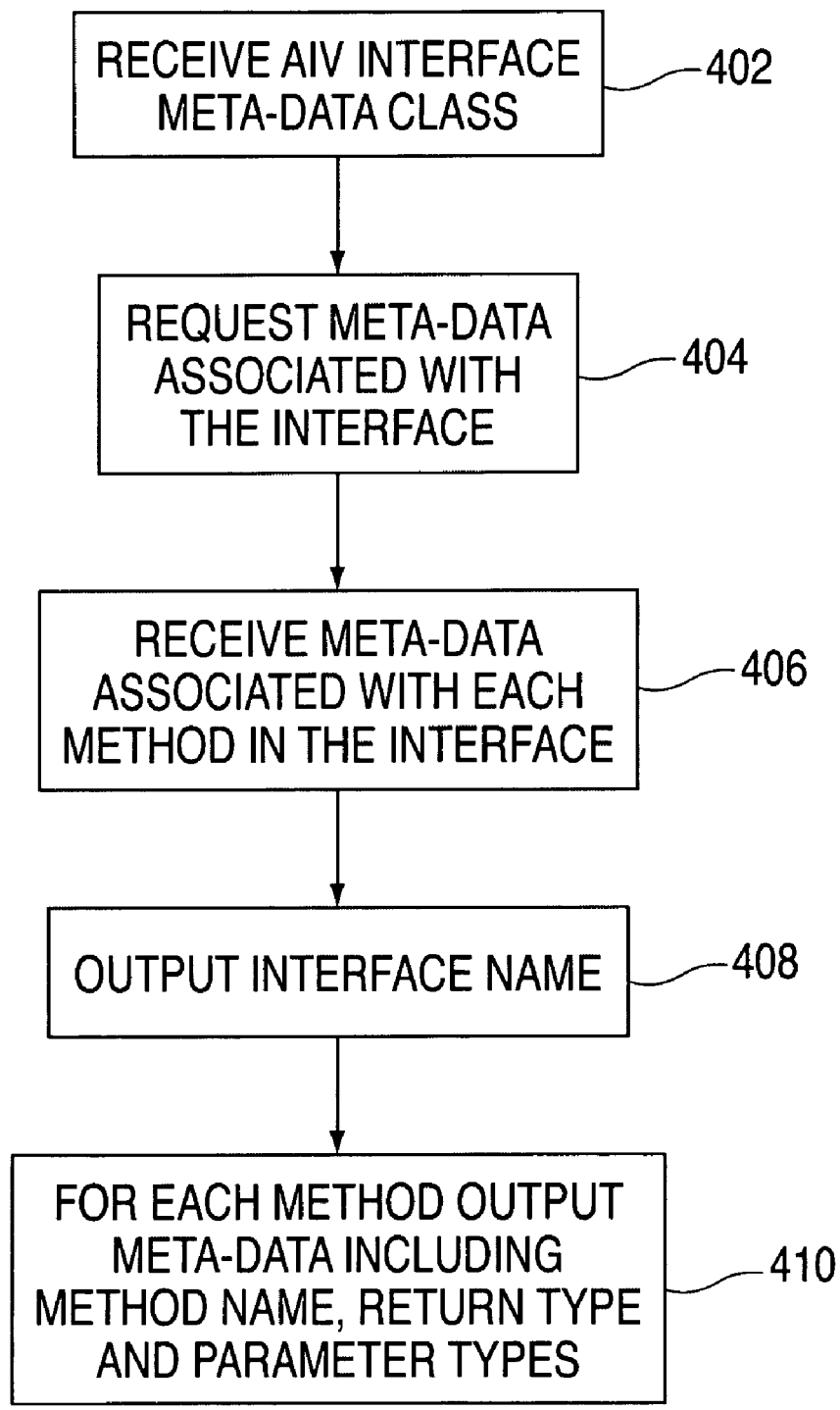
FIG. 4 is an exemplary process flow for providing a meta-data programming language level interface.

FIG. 4 is an exemplary process flow for providing a meta-data programming language level interface. At step 402, a "java.lang.Interface" Java interface meta-data class (either via interface name or a running Java object using the "interface" keyword hook) is received from a client program via a meta-data retrieval API. At step 404, the meta-data associated with the interface is requested. As described above in reference to Java, this information may be located in a Java byte array based on data located by a ClassLoader instance and entered into the Java byte array. Different programming languages will store and locate the interface (or abstract class) source data in different manners. The meta-data class will call a method associated with the correct programming language to retrieve the correct data. At step 406, the meta-data associated with each method contained in the interface is received. At step 408, the interface name is output. Next, at step 410, meta-data, such as method name, return type and parameters types are output.

In an alternate exemplary embodiment another hook may be utilized to provide an interface name to retrieve a Java interface meta-data class. Example code for directly using an interface name includes:

```
        java.lang.Interface bird = java.lang.Interface.forName("Bird");
        // special built-in static method "forName" returns an instance of
        "java.lang.Interface" for Bird interface meta-data class
```

Example code for directly using a Java object via an "interface" keyword hook includes:

```
Human man = (Human) clark;
Bird bird = (Bird) clark;
printInterface(man.interface);
// where man.interface is an instance of "java.lang.Interface" for the
Human interface meta-data class
printInterface(bird.interface)
// where bird.interface is an instance of "java.lang.Interface" for the
Bird interface meta-data class
```

An exemplary embodiment of the present invention may be used by WebSphere for zOS v.4.01 SL4 System Management for Java Programming Language to introspect the Enterprise Java Bean (EJB) method level deployment descriptors. In addition, the exemplary embodiment may be utilized to properly assign method level deployment descriptors without requiring an Enterprise Archive (EAR file which contains one or more EJBs) to contain all Java classes that each of the EJBs reference. In this manner, the zOS's system management deployment strategy where deployment of each EAR may be done separately from the deployment target application server (where each application being deployed is required to provide all referenced classes) may be supported.

Embodiments of the present invention may be utilized to provide dynamic information about what an object is capable of handling. Instead of being forced through a database to collect meta-data (e.g., CORBA implementation) embodiments of the present invention allow the meta-data information to be accessed via a program during runtime. In this manner, the client may dynamically determine the capabilities of a particular object's interface.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing a meta-data programming language level interface, the method comprising:
   receiving an object name from a client program via a meta-data retrieval API, wherein said object name corresponds to a runtime object instance located in a runtime environment that includes one or more methods;
   requesting meta-data associated with said runtime object instance from said runtime environment;
   receiving said meta-data for each said method included in said runtime object instance; and
   transmitting said meta-data for each said method to said client program via said meta-data retrieval API.

2. The method of claim 1 wherein said client program is written in Java.

3. The method of claim 2 ftwther comprising:
   creating an internal data structure of the input class byte array in response to said requesting; and
   extracting a field and method data from said input class byte array to create said meta-data.

4. The method of claim 2 wherein said meta-data retrieval API includes a Java meta-data class.

5. The method of claim 2 wherein said meta-data retrieval API includes a Java interface meta-data class.

6. The method of claim 2 wherein said meta-data retrieval API includes a Java method meta-data class.

7. The method of claim 2 wherein said meta-data retrieval API includes a Java field meta-data class.

8. The method of claim 2 wherein said meta-data retrieval API includes a Java meta-data type.

9. The method of claim 2 wherein said meta-data retrieval API includes a Java interface meta-data type.

10. The method of claim 2 wherein said meta-data retrieval API includes a Java parameter meta-data type.

11. The method of claim 2 wherein said meta-data retrieval API includes a Java exceptions meta-data type.

12. The method of claim 1 wherein said client program is written in C++.

13. The method of claim 12 wherein said meta-data retrieval API includes a C++ meta-data class.

14. The method of claim 12 wherein said meta-data retrieval API includes a C++ meta-data type.

15. The method of claim 1 further comprising retrieving said meta-data.

16. The method of claim 1 further comprising retrieving said meta-data in a purely abstract manner.

17. The method of claim 1 wherein said meta-data describes a parameter.

18. The method of claim 1 wherein said meta-data describes an exception.

19. The method of claim 1 wherein said meta-data describes a return type.

20. The method of claim 1 wherein said meta-data includes source code.

21. A computer program product for providing a meta-data programming language level interface, the computer program product comprising:
   a storage medium readable by a processing circuit and storing instructions for execution by the processing circuit for performing a method comprising:
   receiving an object name from a client program via a meta-data retrieval API, wherein said object name corresponds to a runtime object instance located in a runtime environment that includes one or more methods;
   requesting meta-data associated with said runtime object instance from said runtime environment;
   receiving said meta-data for each said method included in said runtime object instance; and transmitting said meta-data for each said method to said client program via said meta-data retrieval API.

22. A system for providing a meta-data programming language level interface, the system comprising:
   a processor in communication with a client system and a runtime system, the processor including instructions to implement a method including:
   receiving an object name from a client program via a meta-data retrieval API, wherein said object name corresponds to a runtime object instance located in a runtime environment that includes one or more methods, said client program is located on the client system, and said runtime envfronment is located on the runtime system;
   requesting meta-data associated with said runtime object instance from said runtime environment;
   receiving said meta-data for each said method included in said runtime object instance from said runtime environment; and
   transmitting said meta-data for each said method to said client program via said meta-data retrieval API.

* * * * *